Figure 1:
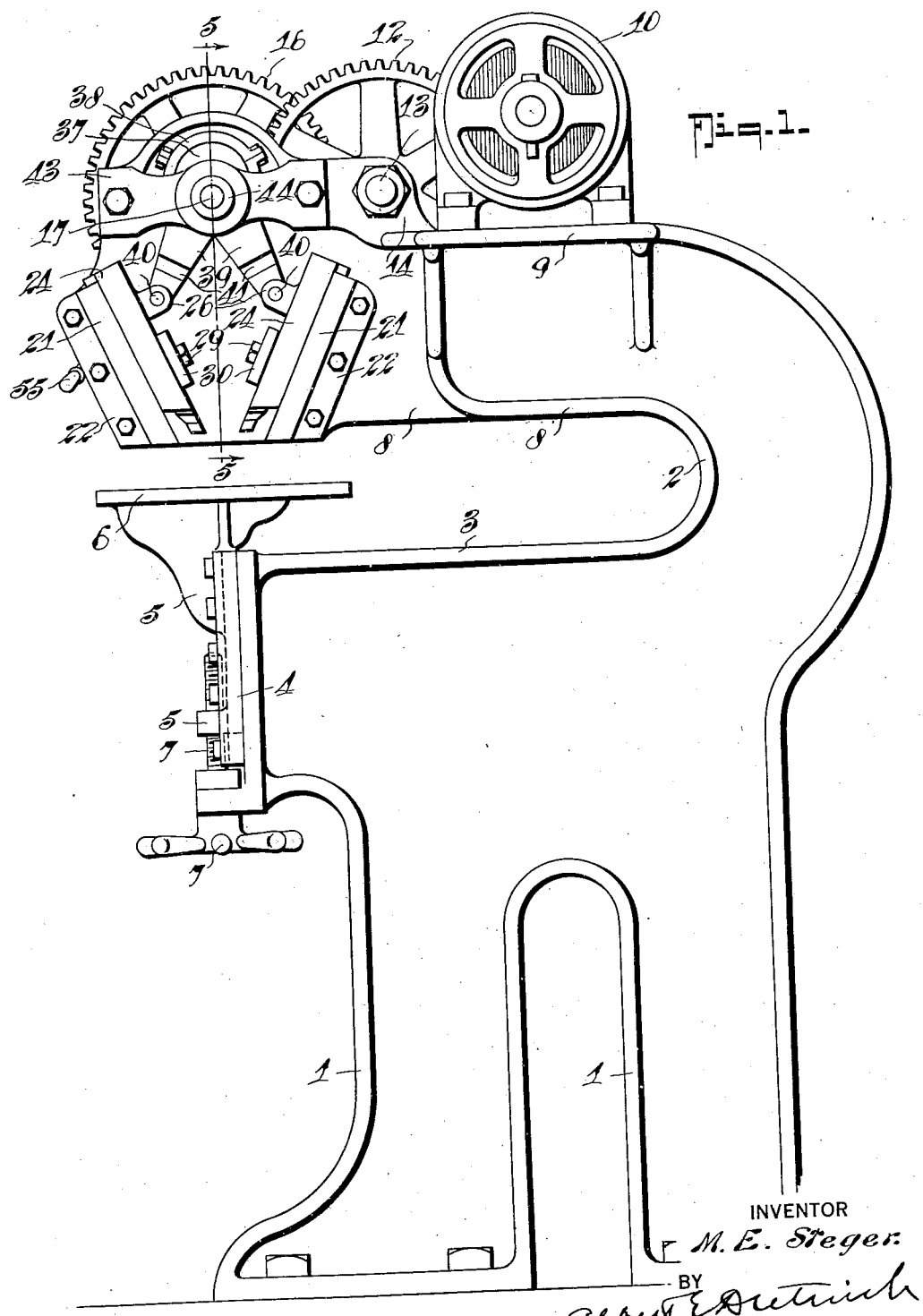

May 24, 1927.

M. E. STEGER 1,629,595

DEFECT REMOVING AND PATCH CUTTING MACHINE

Filed Jan. 22, 1925

5 Sheets-Sheet 1

INVENTOR
M. E. Steger.
BY
ATTORNEY

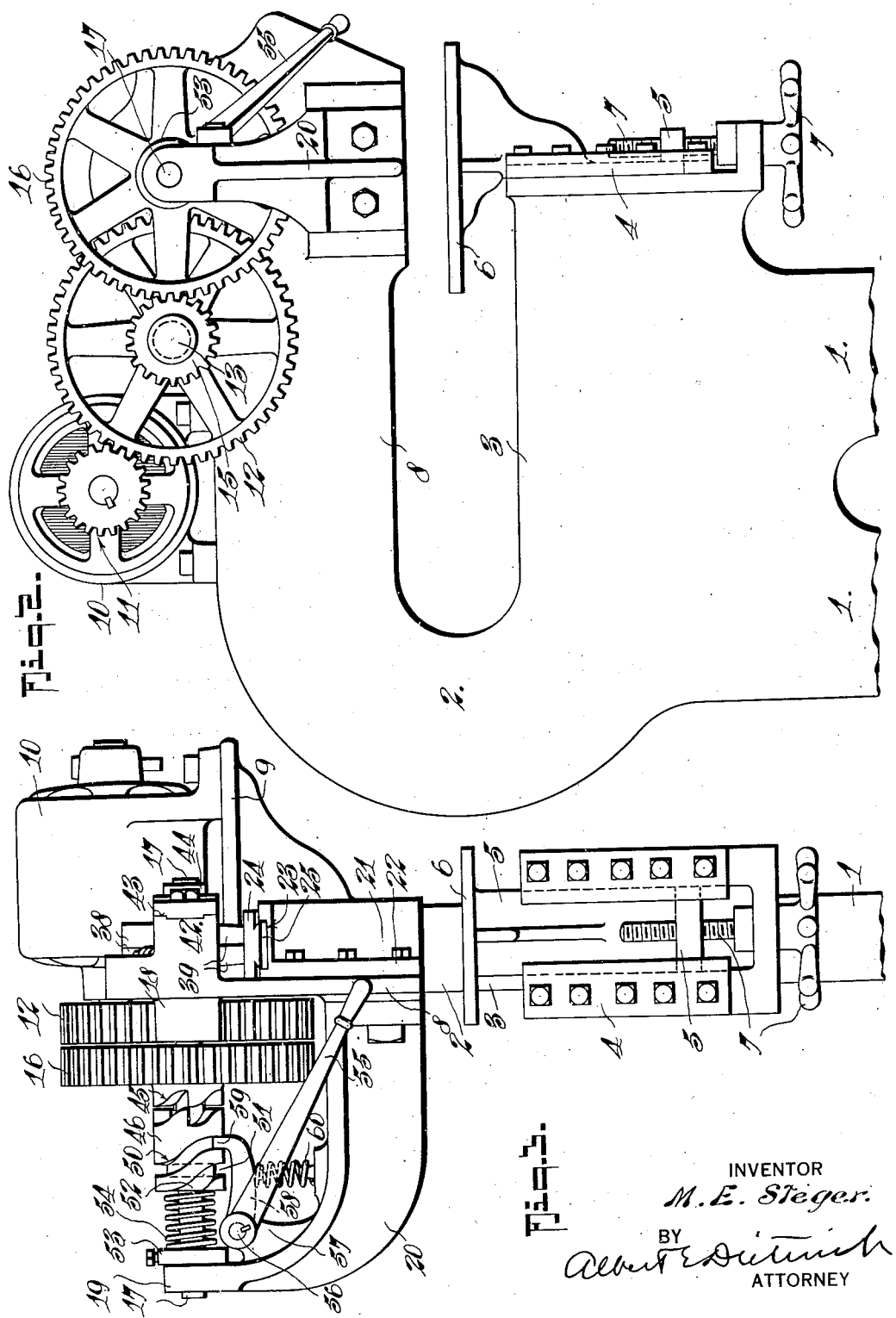

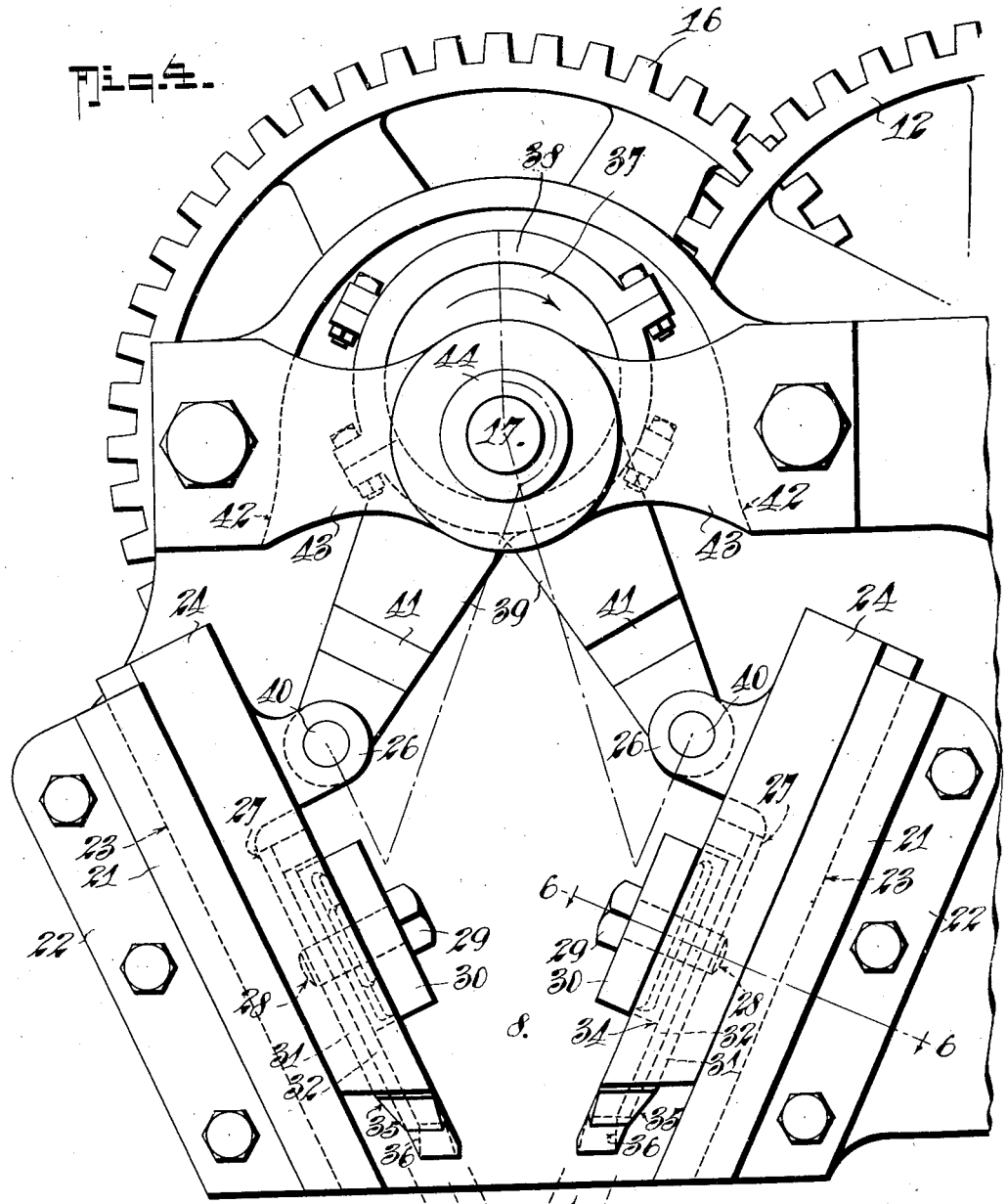

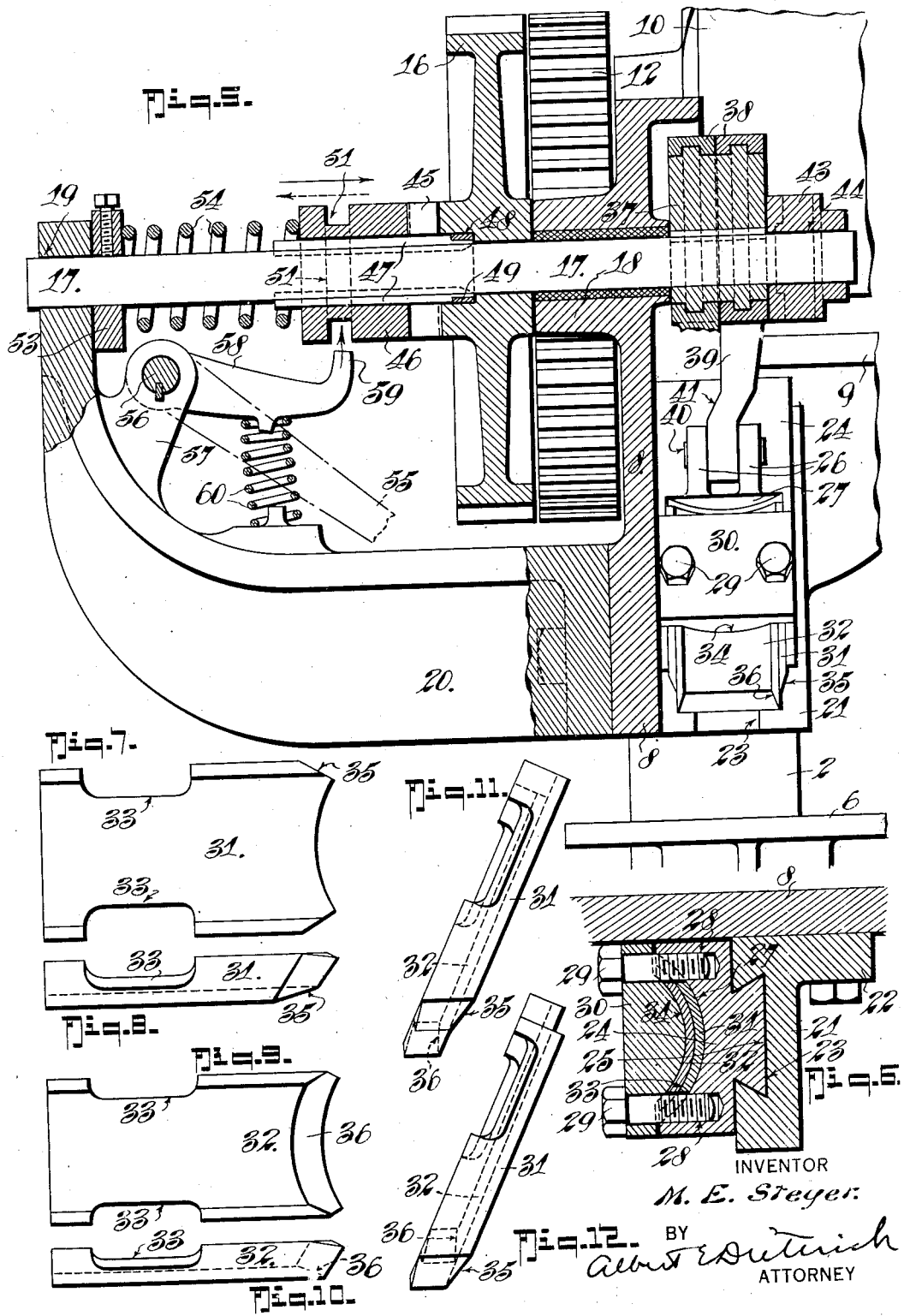

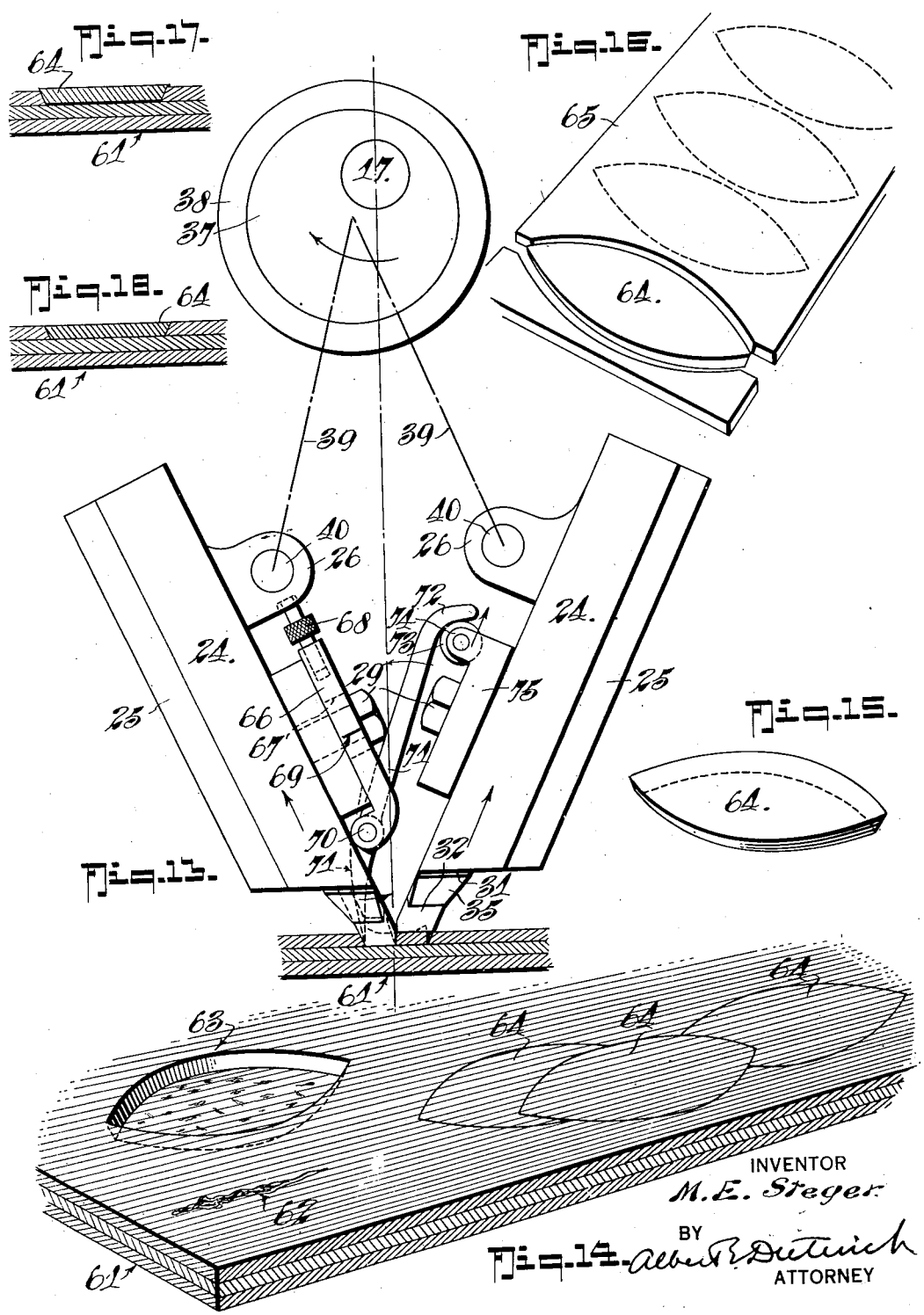

Patented May 24, 1927.

1,629,595

UNITED STATES PATENT OFFICE.

MARVIN EARL STEGER, OF McCLEARY, WASHINGTON.

DEFECT-REMOVING AND PATCH-CUTTING MACHINE.

Application filed January 22, 1925. Serial No. 4,093.

The invention generally relates to the art of wood working and has for its primary object to provide a machine for effectively removing defects from lumber and cutting proper sized and shaped patches for filling the recesses formed by the defect removing action.

An example illustrative of the utility of the invention may be had by considering the manufacturing of panelling for use in construction of doors and other structures. It is common to construct such panels of two or three ply laminated veneer and much Washington fir is used for the purpose. This wood is beautiful in color and grain but is frequently marred by surface defects, such as pitch pockets, knots and the like. The use of the stock in natural state would, of course, detract greatly from the beauty and commercial value of the finished product, and the practice of sawing out the defects results in great losses and waste such as should be frowned down upon in the present day of economical trend and encouraged forest conservation.

Therefore, the invention has for its particular object to provide a machine capable of neatly and effectively cutting out the defects referred to, and, by a slight adjustment, cutting properly sized and shaped patches for so neatly fitting the recesses formed by the defect removing act that their detection is possible only after critical scrutiny.

Another object of the invention is to so construct and mount the cutting elements as to cause them to cut bevel-edged recesses and patches so that when brought into co-operative relation the said patches will provide an overlapping pressing fit tending to curtain the joined edges and provide an unusually neat patched finish.

The invention further comprehends a structure embodying adjustable cooperation of supporting table and cutting elements, thereby providing for slight adjustments of the size of recess and patch.

The invention still further comprehends the provision of means for aiding the removal of the defect after the same has been cut.

With the above and other objects in view that will hereinafter appear, the invention further resides in the novel details of construction, combination and arrangement of parts, all of which will be first fully described, then be particularly pointed out in the appended claims, reference being had to the accompanying drawings, in which:—

Figure 1 is a front face view of an automatic machine embodying the invention.
Figure 2 is a rear face view of the machine.
Figure 3 is a side elevation of the machine.
Figure 4 is an enlarged front elevation of the knives and the associated mounting and operating devices therefor.
Figure 5 is a vertical longitudinal section taken on the line 5—5 of Figure 1.
Figure 6 is a detail cross section taken on the line 6—6 on Figure 4.
Figures 7 and 8 are plan and edge views of one of the patch cutting knives.
Figures 9 and 10 are plan and edge views of one of the defect removing knives.
Figures 11 and 12 are edge views showing the relative adjustment of a pair of defect removing and patch cutting knives set to the defect removing and patch cutting relations respectively.
Figure 13 is a somewhat diagrammatic front face view illustrating the application and operation of a defect kick-up rake device in cooperation with the knives when set to the defect removing position.
Figure 14 is a detail perspective view and part section of a piece of veneer panel illustrating a defect to be removed, a recess formed by the removal of a defect and ready to be patched, and several superposed fixed patches.
Figure 15 is a detail perspective view of a patch.
Figure 16 is a detail perspective view of a veneer strip from which the patches are cut.
Figures 17 and 18 are cross sections showing a patch placed for being fixed to position and fixed to position respectively.

In the practical development of my invention I provide a supporting base 1 which is U-shaped, as at 2, to provide a lower leg portion 3 which serves to support a vertical guideway 4, in which the vertical slide 5 carrying the supporting table 6 is mounted, and which said slide may be vertically adjusted through the medium of the connections 7, and an upper leg portion 8 which serves to support the operative mechanism of the machine.

Mounted on a table extension 9 of the upper leg 8 is a power motor 10, the driven shaft of which is provided with a small driving pinion 11 adapted to mesh with the large idler gear 12 mounted on the stub shaft 13 which has bearing in the portion 14 formed on the upper frame leg 8. The idler 12 has cast integrally therewith, or secured thereto, a small driving pinion 15 adapted to mesh with the large gear 16 loosely mounted on the knives actuating shaft 17, which said shaft has bearing, as at 18, in the upper leg 8 of the frame and, as at 19, in the bracket 20 secured to the extended flange portion of said upper leg, see Figures 2, 3 and 5.

Slide guides 21 are flange-secured, as at 22, to that side of the flange of the upper leg 8 opposite the bracket 20 on downwardly converging angles of 65°. The slide guides are dove-tail grooved, as at 23, in order to provide a slidable mounting for the slide blocks 24 each of which is provided with a dove-tail tennon 25 for slidably fitting in the respective groove 23 of the said guides. The slide blocks 24 are each also provided with extended ears 26, the purpose for which will later appear, a concaved recess 27 extending from the said ears to the bottom edge thereof, and threaded taps one adjacent each side edge thereof, see Figures 3, 4, 5 and 6.

The threaded taps 28 of the slide blocks are adapted to receive the securing screws 29 which pass through apertures provided for the purpose in the clamp blocks 30, one such block being provided for each slide block and serving to securely clamp the knife set of the particular block to the desired adjustment, see Figures 5 and 6.

It should be here stated that a set of cutting knives are adapted to be securely clamped to each slide block 24 by the clamp block 30 cooperative therewith in such manner that the knife sets may be readily adjusted that they may perfectly engage the stock and also for the purpose of changing the positions of the knife sets to adapt them for either of their effective functions, i. e., the cutting of defects from the surface of the stock or the cutting of patches for replacing the defects so removed.

Each knife set includes a pair of concentrically arcuate knives, the larger one 31 of each set being hereinafter termed the patch cutting knife, and the inner or smaller one 32 of each set being hereinafter termed the defect removing knife.

By this arrangement the cutting elements have their concavities opposed and their cutting edges lie in a plane to which the axes of the curvature of their concavities are oppositely inclined, and they are caused to travel on converging lines substantially parallel to the inclination of said axes of curvature toward and from a common plane.

It will be observed, by reference to Figures 6 to 10 of the drawings that the knives are each edge-notched as at 33 to facilitate free passage of the clamping screws 29, the said notches being of sufficient length to permit longitudinal relative movements of the knife blades to facilitate the setting thereof to either of their operative positions, as defect removing or patch cutting elements. In Figure 11 of the drawings, I have illustrated the relative positions of the knives of a set adapting the same for use in removing defects, while in Figure 12 I have similarly illustrated the patch cutting relation. It will be readily understood that after the knife sets have been relatively positioned the clamping screws 29 will be screwed home to cause the clamping block 30 to secure the said knife set to its adjusted position, the convex portion 34 of that clamp block serving to effect the necessary clamping action.

It will also be observed by reference to the figures stated that the patch cutting blades 31 are bevelled at 35 from their outer faces to provide cutting edges, while the blades 32 are bevelled from their inner faces to provide cutting edges, the said cutting edges thus being provided at the opposed engaging concentric faces of the said knives and from which it will be readily understood that the cutting edges of the said patch cutting knives will be very slightly further apart than those of the defect removing blades so that the patches cut thereby will be just that slight degree larger than the recess formed by the removing of the defect from the face of the stock, see Figures 4 and 17.

It is an object to provide means for causing the knife sets to travel toward a point of convergence and to engage the stock to be operated upon during the course of that travel and to be retracted from such operative position to be again brought into play for the next function, see Figures 4 and 13 of the drawings. To effect this movement of the knives I have provided one type of mechanism which accomplishes the broad purpose and in addition some movement features which are advantageous. I desire it understood, however, that I do not wish to be limited to the specific means for imparting motion to the knives disclosed herein as other means for effecting the desired functions may be provided without transcending the spirit of the invention as expressed in the appended claims.

In the disclosure here made I have provided a double eccentric 37 which is keyed upon to rotate with the extended end of the shaft 17 and which is adapted to act upon the pair of straps 38 each thereof having a depending operating arm 39 which is pivotally connected to the ears 26 of one of the slide blocks 24, as at 40. It will be observed, by reference to Figures 4 and 5 of the drawings that the arms 39 are offset, as at 41, so that the point of connection of both said arms with the ears 26 of the said slide blocks will be in the same central plane.

The upper leg 8 of the framing is provided with extensions 42 to which is secured a cross head 43 which serves to provide a bearing, as at 44, for the extension of the shaft 17.

From the foregoing it should be readily apparent that when the shaft 17 is rotated in any approved manner the eccentric 37 carried thereby will cause an upward and downwardly converging and diverging movement of the knives through the connection of the ears 26 with the slide blocks 24, thus serving to force the knives downwardly into the desired engagement with the stock and upwardly again to the normal position through each complete rotation of the said shaft.

In the operation of my invention I have found it practical to employ means, as herein mentioned, hand lever controlled, for effecting operation of the knives through single cycles of operation such as above referred to.

For the purpose just above stated I provide the loosely mounted large gear 16 with an extended clutch face 45, which is adapted to cooperate with the face of the clutch element 46 spline connected, as at 47, to be slidable upon the shaft 17, the said gear 16 being recessed as at 48 to accommodate the projection of the said splines. A ring 49 may be provided to fit over the shouldered ends of the splines extended into the recess 48 of the gear to serve to effectively hold the said splines to position and against possibility of engagement with the said gear.

The clutch element 46 is provided with a half spiral groove 50 in the peripheral surface thereof, that is,—a groove which is spiral in shape but which extends around only half the diameter of the said clutch. This half spiral groove merges with a half straight groove 51, that is,—a groove which communicates with said half spiral groove and which extends from the point of communication the remaining half way around the said clutch element.

An additional quarter spiral groove 52 may be provided to communicate with the half straight groove and to extend through the edge of the said clutch element, as indicated in Figure 3 of the drawings.

A stop collar 53 is secured to the shaft 17 adjacent its bearing at 19 and a coil spring 54 is mounted on the said shaft and interposed between the said stop collar and the clutch element 46. The spring 54 tends to normally force the clutch element 46 into clutching engagement with the clutch face 45 of the loosely mounted gear 16.

A control lever 55 is provided and is keyed to the shaft 56 having bearing, as at 57, in an extension of the bracket 20, and a crank arm 58 is keyed to the other end of the said shaft 56 and is provided with a finger 59 normally forced into engagement with the clutch element 46 by the spring 60.

The position of mounting of the control lever 55 and crank 58 is such that the finger 59 will engage the half straight groove 51 when the clutch element 46 is in the "clutched in" position illustrated in Figure 5 of the drawings, that is,—with its clutch face engaging the clutch face 45 of the gear 16, and adapted to engage the stop end of the half spiral groove 50 in the manner illustrated in Figure 3 of the drawings for serving to hold the said clutch element to the "out of clutch" position illustrated in the said figure.

Assuming the parts to be is the position indicated in Figure 3 of the drawings, the operator of the machine, desiring to remove a defect from a panel or cut a patch, as the case may be, will press the lever 55 downwardly to a degree sufficient for freeing the finger 59 of engagement with the stop end of the half spiral groove 50, allowing the spring 54 to force the clutch element 46 into clutching engagement with the gear 16. It should be understood that the motor 10 operates continuously so that when this clutching-in action occurs rotation will be imparted to the knives-actuating shaft 17 through the gear train 11—12—15—16. The shaft 17 being thus caused to rotate the double eccentric 37 carried thereby will be caused to move from the knives elevated position illustrated in Figure 4 of the drawings to effect a downward forcing of the knives for the purpose hereinbefore explained, it being understood that as the shaft makes a complete revolution the knives will be forced to their downward limit and brought back again to the normal position as stated by which time the clutch controlling devices will have acted to throw the clutch out of engagement and to stop the said shaft 17 from further rotation. Thus the knife actuation is effected through a single cycle of operation by each depression of the control lever 55.

When the operator depresses the lever to allow clutch engagement he, of course, immediately releases the same whereupon the finger 59 is forced into the half groove 51 in the manner illustrated in Figure 5 of the drawings and as the clutch element 46 is rotated the said finger will be caused to pass into the half spiral groove 50 to thereby serve as a means for retracting the said clutch element from clutching engagement or, in other words, to retract the said clutch element from the position illustrated in Figure 5 of the drawings to that illustrated in Figure 3, it being understood that when the said clutch finger comes to engagement with the stop end of that half spiral groove, as is illustrated in the said Figure 3, rotation of the said clutch element will cease while that of the gear train may continue without any effect whatever on the knives actuating shaft 17.

By providing the eccentric as a means for actuating the knives it will be understood that the knife set toward that side of the center of rotation of the said eccentric toward which side the said eccentric is rotated will be caused to move downwardly slightly in advance of the other knife set in the manner illustrated in Figure 4 of the drawings. The reason for this will be apparent by reference to the dot and dash construction lines on Figure 4 illustrating the difference in length of the arm 39 relative to the effective center of the eccentric. Thus the advance set of knives will act upon the stock, complete their function and start their retractive movement as the opposed set of knives commence their actual stock engagement, see dotted arrows on Figure 4. It will follow, of course, that as the advance set of knives leave the stock engaging position the opposite set of knives will be completing their function, see Figure 13 of the drawings.

By reason of the arrangement stated it is possible to have the outermost lateral edges of the knives which provide for cutting the ends of the substantially eye-shaped recesses, such as are illustrated is Figure 14 of the drawings, overlapping the converging point of their movement in very slight degree to effectively ensure a clean removal of the defect or the provision of a sharp cornered patch, such as is illustrated in Figure 15 of the drawings. Also by providing for a cutting of the edges of the defect removing recesses alternately, that is first one edge, then the opposite edge, force is exerted at one side tending to set up lateral displacement of the defect and then on the other side as the opposing set of knives are being retracted. In this manner, a lateral force is alternately exerted against the defect to be removed greatly aiding in loosening and the effective removal of the said defect. It should be understood by reference to Figures 4 and 13 of the drawings that the knives are preferably adapted to cut down through the top ply of the veneer panel only so that the defect will make a clean break at the glue point, thus facilitating proper removal. In the drawings I have illustrated the panel stock as being of the common three-ply variety and have indicated the same by the numeral 61. It should be understood, however, that the invention is just as adaptable for patching two-ply panels if it should be desired, and even for use upon solid material.

In Figure 14 of the drawings I have shown in sectional perspective a portion of a veneer panel illustrating a defect by the numeral 62, a recess formed by the removal of a defect indicated by the numeral 63 and several superimposed fixed patches indicated by the numeral 64, thus effectively illustrating the purposes of the invention.

In Figure 16 of the drawings I have illustrated a strip of veneer, such as is used to form the patches, by cutting through the same with the knives in the manner hereinbefore described. It will be observed that a relatively narrow strip of veneer is used so that in cutting the patches the amount of waste is reduced to the minimum.

In the practical development of my invention I have found it desirable at times, although not indispensable, to provide a defect displacing rake to aid in gouging out the defect from between the knife blades after they have made their edge cuts. I have illustrated the application of such a device in cooperation with the knife sets in Figures 13 of the drawings.

When using such a device, as above referred to, I provide a bearing plate 66 slotted as at 67 to provide for adjustment over and clamping action of the clamping screws 29 of the blocks 30, which said screws serve to secure said plate to the operative position illustrated in the said figure. A thumb screw adjusting device may be provided to aid in effecting minute adjustments of the plate 66 to ensure perfect cooperation of the rake device with the knife sets. The plate 66 may be offset, as at 69, and serve to provide a pivotal connection at 70 for the defect displacing rake 71. The upper end of the rake device 71 is bent as at 72 to provide a cam portion adapted to be engaged by the cam roller 73 carried, as at 74, by the clamp block 75 which may be similar in construction and function to the clamp blocks 30, as hereinbefore described in detail.

It will be apparent by reference to Figure 13 of the drawings and prior description relative to the movement of the opposed knife sets that when the advance knife set has just left engagement of the stock the opposed knife set will be at the lowermost limit of its stroke and the rake operating devices are so mounted that they come into play at the instant stated and as illustrated in the figure referred to, the raking action taking place at the instant the following set of knives is at the lowermost limit of its stroke and still engaging the stock with downward pressure.

It will be understood, of course, that when the raking device is used in cooperation with the defect removing knives it must always be removed before utilizing the invention for cutting patches.

It will be obvious by reference to Figures 3 and 4 of the drawings that the elevation of the table 6 may be varied by actuation of the connections 7 and the perfect contact of the knife sets with the stock being acted upon thus controlled.

As before stated, the patches which are cut by the patch cutting knives 31 are of dimensions very slightly in excess of the dimensions of the recesses formed by removing the defects, the relation being as illustrated in Figure 17. By thus sizing the patch and the recess it is supposed to fill the slightly overhanging edges of the patch will, when forced to position, as illustrated in Figure 18, effectively serve to curtain the joints thus providing a particularly neat patch which, when properly selected, and applied, and when the coating stain is applied may be detected only after a most careful scrutiny of the work.

In operating the invention, the operator will cut a stock of patches and will carefully grade them as to color and grain into separate compartments so that when the defects have been removed from the stock and the patching action is to take place he may readily select such of the patches as will most effectively fill the recesses without detection.

From the foregoing description, taken in connection with the accompanying drawings, it is thought the novel details of construction, manner of operation and the advantages of my invention will be readily apparent to those skilled in the art to which it relates.

What I claim is:

1. A machine for cutting defects out of the top ply of multi-ply veneer stock, a pair of concave cutting elements having their concavities opposed and the cutting edges of which lie in a plane to which the axes of the curvature of their concavities are oppositely inclined, means for moving said elements alternately on converging lines substantially parallel to the inclination of said axes of curvature toward and from a common plane in which the ends of the cuts made by said edges meet so that their combined cuts sever a portion of the top ply defined thereby.

2. In a machine for cutting defects out of multi-ply veneer stock, a pair of concaved cutting elements having their concavities opposed and the cutting edges of which lie in a plane to which the axes of curvature of their concavities are oppositely inclined, means for moving said elements alternately on converging lines substantially parallel to the inclination of said axes of curvature toward and from a common plane in which the ends of the cuts made by said edges meet so that their combined cuts sever a portion of the stock defined thereby, and a rake device, and means operated by the movement of said cutting elements for actuating the rake device.

3. In a machine of the class described, a pair of opposed cutting elements adapted to be moved into engagement with the surface of the stock in a manner for cooperating with each other in removing a defect therefrom, a rake device for aiding the dislodging of the defect as the knives complete their function, said rake device being carried by one of the pair of cutting elements and actuated by engagement with the other cutting element.

4. A machine for cutting defects out of the top ply of multi-ply veneer stock, a pair of channelled cutting elements, means for mounting said cutting elements for reciprocation on diverging axes located in a common plane normal to the surface of the stock to be cut, the cutting edges of said cutting elements lying in planes paralleling the surface of the stock to be cut, and means to reciprocate said cutting elements in timed relation so that one thereof begins to enter the stock as the other thereof begins to leave the stock.

5. In a machine of the class described, a pair of opposed cutting elements adapted to be moved into engagement with the surface of the stock in a manner for cooperating with each other in removing a defect therefrom, a rake device carried by one element with its lower end lying closely adjacent the cutting edge thereof whereby it will enter the cut with the said edge, and means carried by the other element to cause the lower end of said device to move laterally to cause it to dislodge the defect from the surface of the stock as the cutting elements complete their cutting function.

6. In a machine of the class described, two adjustable knife sets, each set including a pair of nested knives, one knife of each set cooperating with the corresponding knife of the other set to cut out defects, and the other knife of each set cooperating with the corresponding knife of the other set to cut out patches and means to adjust the several cooperating pairs of corresponding knives to operative position accordingly as it is desired to cut out defects or to cut patches.

7. In a machine of the class described, a pair of concaved cutting elements having their concavities opposed and adapted to be moved into engagement with the surface of the stock in a manner for cooperating with each other in removing a defect out of the surface only of that stock, means for so moving the said cutting elements, and a rake device carried by one cutting element and having an end lying in the concavity thereof close to the cutting edge, and means to move the rake device laterally as the cutting elements complete their function for the purposes specified.

8. In a machine of the class described, a pair of knife sets each having two cutting edges, one cutting edge of each set cooperating with the corresponding cutting edge of the other set to cut out defects, the remaining cutting edge of each set cooperating with the corresponding cutting edge of the other set to cut out patches, and means to bring each pair of cooperating cutting edges into operative relation accordingly as it is desired to cut patches or to remove defects.

9. In a machine of the class described, a pair of concaved cutting elements having their concavities opposed and adapted to be moved into engagement with the surface of the stock in a manner for cooperating with each other in removing a defect out of the surface only of that stock, means for guiding the movement of the said cutting elements to cause them to travel in diverging paths when retracting and in converging paths when moved to the stock engaging position, said guides being positioned for causing the paths of travel of the corners only of the concaved cutting elements to slightly overlap, and a rake device carried by the trailing one of the cutting elements and having one end lying in the concavity thereof close to the cutting edge, and means to move the rake device laterally as the said trailing element completes its cut for the purposes specified.

10. In a machine of the class described, a pair of opposed cutting elements adapted to be moved into engagement with the surface of the stock in a manner for cooperating with each other in removing a defect therefrom, means for guiding the movement of the said cutting elements to cause them to travel in diverging paths when retracting and in converging paths when moved to the stock engaging position, means for effecting movement of said cutting elements in a manner causing one of the pair thereof to move in advance of the other to engage and complete its stock cutting function and recede from engagement therewith by the time the other element engages said stock, and a rake device for aiding the dislodging of the defect as the knives complete their function, said rake device being carried by one of the pair of cutting elements and actuated by engagement with the other cutting element to be brought into action just as the trailing cutting element has completed its function.

11. In a machine of the class described, a pair of adjustable knife sets adapted to be moved into engagement with the surface of the stock in a manner for cooperating with each other in removing defects or cutting patches therefrom according to the adjustment of said knife sets, each said knife set including a pair of concentrically arcuate knife elements adjustably slidable one on the other and being adapted to move with its concaved portion opposed to that of the other set.

12. In a machine of the class described, a pair of adjustable knife sets adapted to be moved into engagement with the surface of the stock in a manner for cooperating with each other in removing defects or cutting patches therefrom according to the adjustment of said knife sets, each said knife set including a pair of concentrically arcuate knife elements adjustably slidable one on the other and being adapted to move with its concaved portion opposed to that of the other set, means for guiding the movement of the said cutting elements to cause them to travel in diverging paths when retracting and in converging paths when moved to the stock engaging position.

13. In a machine of the class described, a pair of adjustable knife sets adapted to be moved into engagement with the surface of the stock in a manner for cooperating with each other in removing defects or cutting patches therefrom according to the adjustment of said knife sets, each said knife set including a pair of concentrically arcuate knife elements adjustably slidable one on the other and being adapted to move with its concaved portion opposed to that of the other set, the inner knife of each set being bevelled to provide a cutting edge at its convex surface, and the outer knife of each set being bevelled to provide a cutting edge at its concaved surface so that the inner knives will cooperate in removing defects and the outer knives in cutting patches as and for the purposes described.

14. In a machine of the class described, a pair of adjustable knife sets adapted to be moved into engagement with the surface of the stock in a manner for cooperating with each other in removing defects or cutting patches therefrom according to the adjustment of said knife sets, each said knife set including a pair of concentrically arcuate knife elements adjustably slidable one on the other and being adapted to move with its concaved portion opposed to that of the other means, means for guiding the movement of the said cutting elements to cause them to travel in diverging paths when retracting and in converging paths when moved to the stock engaging position, a slide block for carrying each set of knives, screw and clamp connections for adjustably securing the knife sets to the slide blocks, the said knife sets being edge notched to permit adjustment, and grooved guides for guiding said slide blocks.

15. In a machine of the class described, a pair of adjustable knife sets adapted to be moved into engagement with the surface of the stock in a manner for cooperating with each other in removing defects or cutting patches therefrom according to the adjustment of said knife sets, each said knife set including a pair of concentrically arcuate knife elements adjustably slidable one on the other and being adapted to move with its concaved portion opposed to that of the other set, means for guiding the movement of the said cutting elements to cause them to travel in diverging paths when retracting and in converging paths when moved to the stock engaging position, a slide block for carrying each set of knives, screws and clamp connections for adjustably securing the knife sets to the slide blocks, the said knife sets being edge notched to permit adjustment, grooved guides for guiding said slide blocks, and an eccentric strap connected to the slide blocks to effect movement thereof to cause them to travel toward and from the stock one in advance of the other.

16. In a machine of the class described, a pair of adjustable knife sets adapted to be moved into engagement with the surface of the stock in a manner for cooperating with each other in removing defects or cutting patches therefrom according to the adjustment of said knife sets, each said knife set including a pair of concentrically arcuate knife elements adjustably slidable one on the other and bevelled to a cutting edge toward their contacting surfaces to adapt them to use as outer patch cutting and inner defect removing elements according to their adjustment, said sets being adapted to move with their concaved portions opposed.

17. In a machine of the class described, a pair of adjustable knife sets adapted to be moved into engagement with the surface of the stock in a manner for cooperating with each other in removing defects or cutting patches therefrom according to the adjustment of said knife sets, each said knife set including a pair of concentrically arcuate knife elements adjustably slidable one on the other and bevelled to a cutting edge toward their contacting surfaces to adapt them to use as outer patch cutting and inner defect removing elements according to their adjustment, the cutting edges of the opposed patch cutting elements being slightly farther spaced than those of the opposed defect removing elements that the recesses formed will be slightly smaller than the patches cut.

18. In a machine of the class described, a pair of adjustable knife sets adapted to be moved into engagement with the surface of the stock in a manner for cooperating with each other in removing defects or cutting patches therefrom according to the adjustment of said knife sets, each said knife set including a pair of concentrically arcuate knife elements adjustably slidable one on the other and bevelled to a cutting edge toward their contacting surfaces to adapt them to use as outer patch cutting and inner defect removing elements according to their adjustment, the cutting edges of the opposed patch cutting elements being slightly farther spaced than those of the opposed defect removing elements that the recesses formed will be slightly smaller than the patches cut, and means for guiding the movement of the opposed sets of cutting elements to cause them to travel in diverging paths when retracting and in converging paths when moved to the stock engaging position to cause them to cut bevel-edged recesses or patches according to their adjustment.

19. In a machine of the class described, a pair of adjustable knife sets adapted to be moved into engagement with the surface of the stock in a manner for cooperating with each other in removing defects or cutting patches therefrom according to the adjustment of said knife sets, each said knife set including a pair of concentrically arcuate knife elements adjustably slidable one on the other and bevelled to a cutting edge toward their contacting surfaces to adapt them to use as outer patch cutting and inner defect removing elements according to their adjustment, the cutting edge of the opposed patch cutting elements being slightly farther spaced than those of the opposed defect removing elements that the recesses formed will be slightly smaller than the patches cut, and an eccentric and connections for causing the knife sets to travel one in advance of the other with their paths of travel slightly overlapping at the stock engaging limit thereof.

20. In a machine of the class described, a pair of adjustable knife sets adapted to be moved into engagement with the surface of the stock in a manner for cooperating with each other in removing defects or cutting patches ther from according to the adjustment of said knife sets, each said knife set including a pair of concentrically arcuate knife elements adjustably slidable one on the other and bevelled to a cutting edge toward their contacting surfaces to adapt them to use as outer patch cutting and inner defect removing elements according to their adjustment, the cutting edges of the opposed path cutting elements being slightly farther spaced than those of the opposed defect removing elements that the recesses formed will be slightly smaller than the patches cut, an eccentric and connections for causing the knife sets to travel one in advance of the other with their paths of travel slightly overlapping at the stock engaging limit thereof, and power mechanism for effecting operation of said eccentric and connections, said mechanism including a driving motor and power transmitting mechanism between said motor and said eccentric connections including a single cycle clutch device.

MARVIN EARL STEGER.